(No Model.) 2 Sheets—Sheet 1.

W. BECK.
MANUFACTURE OF GLASS HANDLES FOR TRAYS, &c.

No. 301,330. Patented July 1, 1884.

Witnesses:
T. C. Brock
Guy L. DeMotte

Inventor
W. Beck
By S. W. Ginsabaugh
Attorney.

N. PETERS. Photo-Lithographer, Washington, D. C.

(No Model.) 2 Sheets—Sheet 2.

W. BECK.
MANUFACTURE OF GLASS HANDLES FOR TRAYS, &c.

No. 301,330. Patented July 1, 1884.

Witnesses: Inventor:

UNITED STATES PATENT OFFICE.

WASHINGTON BECK, OF PITTSBURG, PENNSYLVANIA.

MANUFACTURE OF GLASS HANDLES FOR TRAYS, &c.

SPECIFICATION forming part of Letters Patent No. 301,330, dated July 1, 1884.

Application filed May 10, 1884. (No model.)

*To all whom it may concern:*

Be it known that I, WASHINGTON BECK, a citizen of the United States, residing at Pittsburg, in the county of Allegheny and State of Pennsylvania, have invented certain new and useful Improvements in the Manufacture of Glass Handles for Trays, &c., of which the following is a specification, reference being had therein to the accompanying drawings.

My invention relates to the manufacture of glass handles for trays and other purposes.

The object of my invention is to press open handles for trays and other purposes in a cheaper manner, and at the same time produce an article which will be neat and artistic in its appearance.

Figure 1:
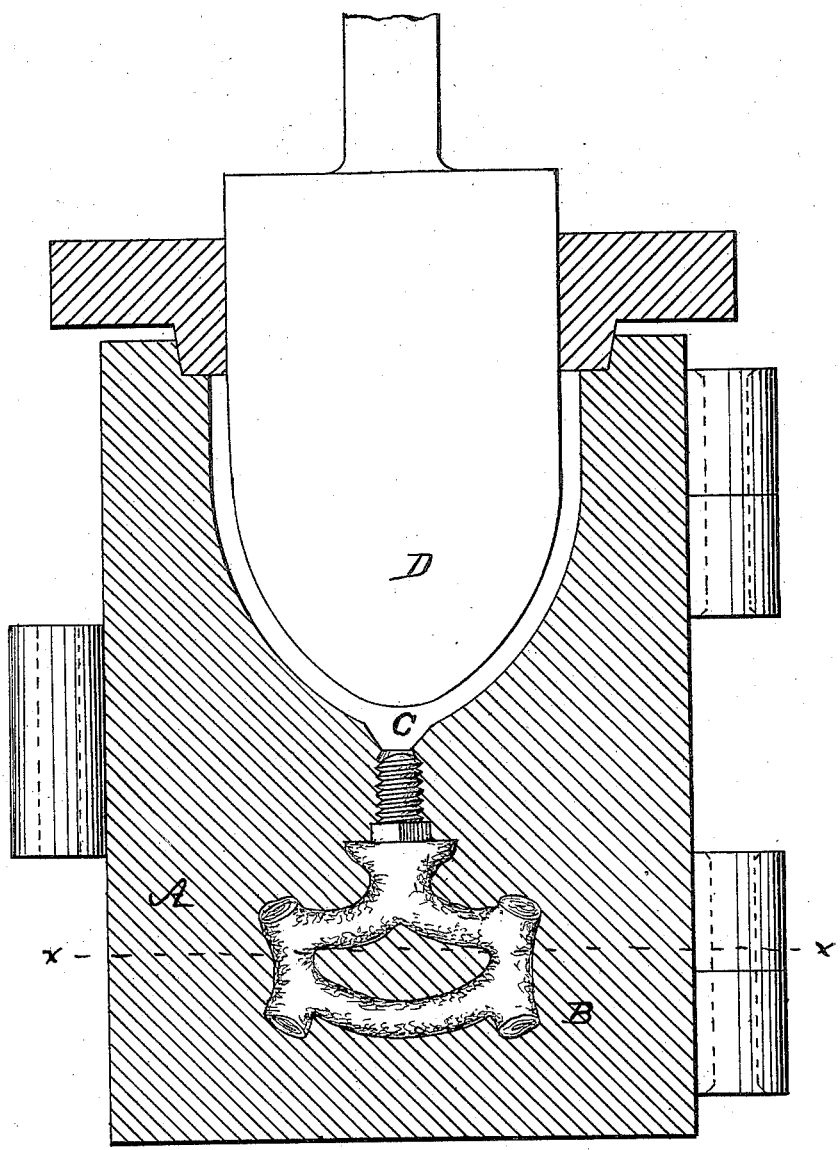
Figure 2:
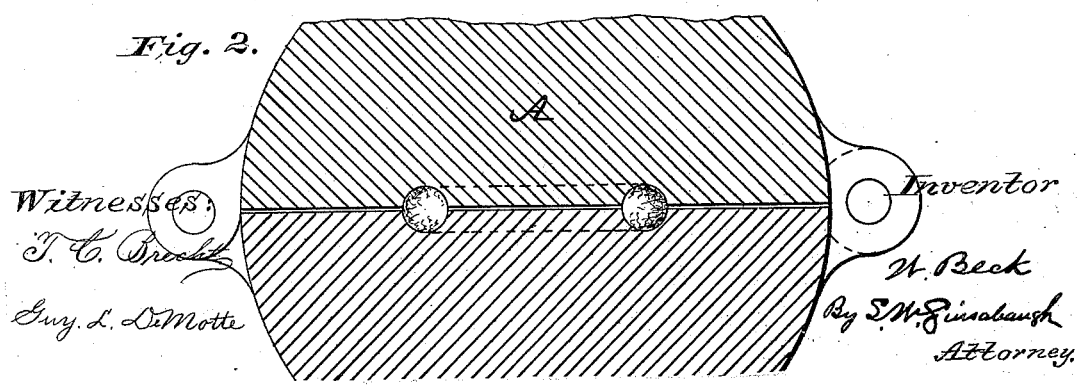
Figure 3:
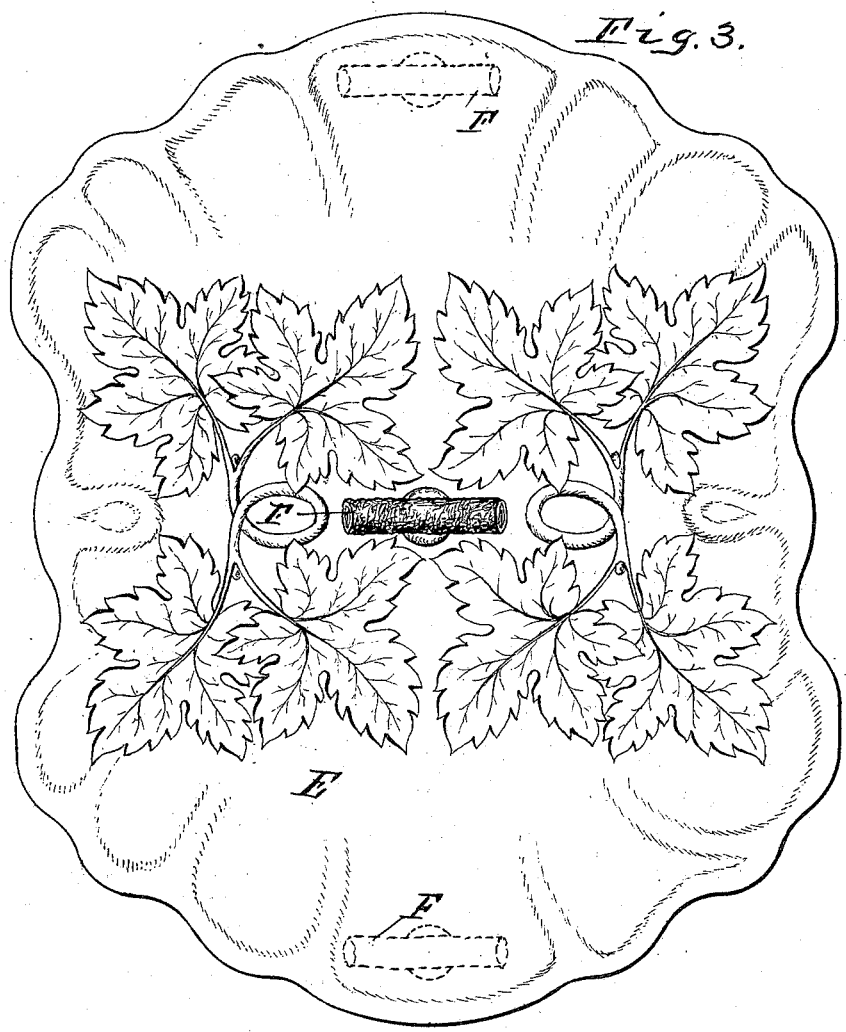
Figure 4:
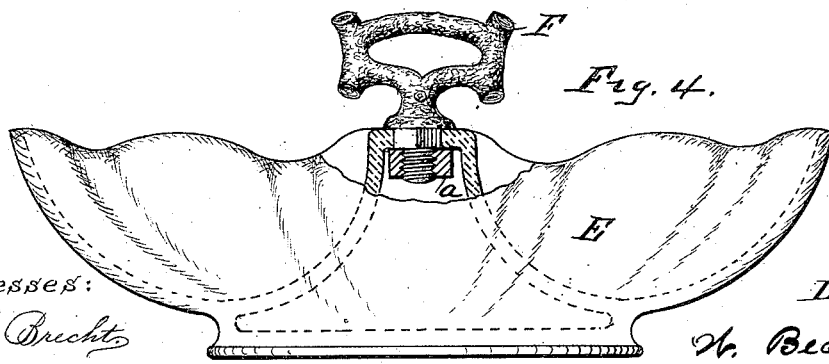

In the drawings, Figure 1 is a vertical sectional view of a mold with the article formed therein. Fig. 2 is a horizontal sectional view taken on the line $x\,x$ of Fig. 1. Fig. 3 is a top or plan view of a tray having the handle or handles attached thereto. Fig. 4 is an end view of a tray, partly in section, showing the manner of attaching the handles to the tray.

Open handles for trays and other analogous articles, when made from glass, have heretofore been pressed on or made part of the article, and are therefore a fixture. Knobs for doors and the like have been pressed in a solid body of glass; but such handles are not desirable or applicable to trays, caster-stands, and other household or table furnishings.

My invention is designed to furnish a handle which can be used on trays, dish-covers, and other articles, whether such articles are made of glass, silver, or other metal.

Referring to the drawings, A indicates the mold, composed of two sections and hinged or joined together in the usual manner.

B is the cavity in which the handle is formed, and in this instance is so fashioned as to give the article a rustic appearance. The upper end of the cavity is screw-threaded, and terminates in a font or glass-receiving cavity, C, the molten glass being placed therein and forced into the cavity B by means of the plunger D. When the glass has properly set or hardened, the molds are opened and the article removed, the surplus glass which is joined to the article being removed, and the screw-threaded portion or end of the handle being ground or otherwise treated to remove the surplus glass.

In Figs. 3 and 4, I have shown a glass tray, E, having the handles F attached thereto by means of a nut, $a$, screwed onto the screw-threaded portion of the handle. The handle or handles may be secured to the tray at any desired point, either in the center, as shown in full lines, or at each end, as shown in dotted lines; and instead of forming the screw-thread thereon I may employ other means for securing the handles to the trays or other articles.

Having thus described my invention, what I claim, and desire to secure by Letters Patent, is—

As a new article of manufacture, an open handle for trays, dishes, &c., made of glass and provided with a screw-threaded or other suitable fastening device, as set forth.

In testimony whereof I affix my signature in presence of two witnesses.

WASHINGTON BECK.

Witnesses:
J. M. YZNAGA,
GUY L. DE MOTTE.